United States Patent [19]

Payne et al.

[11] 4,240,677

[45] Dec. 23, 1980

[54] BEARING MOUNTING DEVICE AND BEARING

[76] Inventors: Douglas L. Payne, 29155 Spoon, Madison Heights, Mich. 48071; Peter A. Walter, 27229 Sherri Lynn Ct., Mt. Clemens, Mich. 48045

[21] Appl. No.: 6,343

[22] Filed: Jan. 25, 1979

[51] Int. Cl.³ .......................................... F16C 35/06
[52] U.S. Cl. .................................... 308/15; 308/236
[58] Field of Search .............. 308/15, 22, 24, 178, 308/193, 236

[56] References Cited

U.S. PATENT DOCUMENTS

| | | | |
|---|---|---|---|
| 929,851 | 8/1909 | Hess | 308/236 |
| 1,894,414 | 1/1933 | Olson | 308/236 |
| 2,884,283 | 4/1959 | Korol et al. | 308/15 |
| 2,895,771 | 7/1959 | Ridgeway | 308/236 |
| 2,970,018 | 1/1961 | Ruttgers | 308/236 |
| 3,438,683 | 4/1969 | Thomson | 308/22 |
| 3,482,890 | 12/1969 | Burrell | 308/15 |

*Primary Examiner*—Richard R. Stearns
*Attorney, Agent, or Firm*—Basile, Weintraub & Hanlon

[57] ABSTRACT

A bearing mounting device and bearing for economical replacement of worn and damaged bearings in a machine housing is disclosed. The bearing mounting device comprises a radially expandable sleeve having radially movable segments along the periphery thereof and a tapered, threaded bore. A bearing with a tapered, threaded outer diameter complementary to the threaded bore of the sleeve threadingly engages the bore of the sleeve, and tightening of the bearing into the bore expands the segments of the sleeve against the housing. With the tapered outer diameter of the bearing, when tightened securely in the bore the bearing and the sleeve are securely fixed in the housing. A spanner wrench is disclosed for rotating the outer race of the bearing into engagement with the sleeve, and a second spanner wrench is disclosed for preventing rotation of the sleeve during insertion of the bearing.

6 Claims, 3 Drawing Figures

BEARING MOUNTING DEVICE AND BEARING

BACKGROUND OF THE INVENTION

I. Field of the Invention

The present invention relates to the field of bearing supports and bearings. Particularly, the present invention relates to the field of bearing supports for efficiently replacing worn bearings on sight of used production machinery. More particularly, the present invention relates to the field of a bearing sleeve support having radially expandable segments and a tapered threaded bore in combination with a bearing having a tapered threaded outside diameter complimentary to the bore. Engagement of the bearing into the bore causes the sleeve segments to expand and engage the housing of the machine in which the bearing is used, and thus eliminating machining a press fit sleeve.

II. Prior Art Statement

U.S. Pat. No. 2,447,853 discloses a threaded bearing support which threadingly engages the housing of a pump. U.S. Pat. No. 2,884,283 discloses a shaft support having a plurality of radially movable segments which collapse radially inward as they are inserted into a bore of the housing and then expand radially outward again to engage the housing once the bearing support has been pushed past the end of a plurality of radially extending lugs which are tapered to aid in the collapsing of the segment. The expansion of the segments to engage the housing brings the ends of the lugs into engagement with the side walls of the housing to retain the support in an axial position. U.S. Pat. No. 3,198,563 discloses a threaded retainer for positioning a ball and socket joint axially within a housing. U.S. Pat. No. 3,482,890 discloses a means for allowing the interchange of various kinds of pillow block bearings in a pillow block in a self-aligning manner. This patent discloses a bearing having a threaded outside diameter which threadingly engages a self-aligning ring of the pillow block. The outer diameter of the bearing has a thread which is straight and not tapered and self locking as disclosed in the present invention. U.S. Pat. Nos. 2,337,290 and 2,331,652 disclose different ways for mounting bearing supports which are not related to the present invention. None of the above disclosed United States patents disclose a bearing support and bearing comprising a sleeve with radially expandable segments, a bore having a tapered threaded profile and a bearing with a threaded tapered outside diameter complimentary to the bore wherein insertion of the bearing into the bore expands the segments radially outward to engage the housing into which the bearing is to be installed.

SUMMARY OF THE INVENTION

The present invention comprises a bearing and bearing mounting sleeve with radially expandable segments along the periphery thereof and a tapered threaded bore. A bearing having a tapered threaded outside diameter complimentary to the bore of the sleeve is threadably engageable into the bore of the sleeve. Threadingly engaging the bearing into the bore expands the radially movable segments radially outward to engage a bore of the housing into which the bearing is to be installed. A pair of diametrically opposed notches or pin holes in an end of the sleeve are engageable with a pair of diametrically opposed lugs or pins of a spanner wrench for preventing rotation of the sleeve as the bearing is threadingly inserted. The bearing has at its outer end a pair of diametrically opposed notches or pins holes which are engageable with a pair of diametrically opposed lugs or pins of a spanner wrench which is used for rotatingly inserting the bearing into the sleeve. When the bearing has been tightened into the sleeve and the segments expanded outward to engage the housing, the sleeve and bearing are securely held in place for operation of the machine.

Other advantages and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings like reference numbers refer to like parts throughout the several views and wherein.

DESCRIPTION OF THE PREFERRED EMBODIMENT

Figure 1:
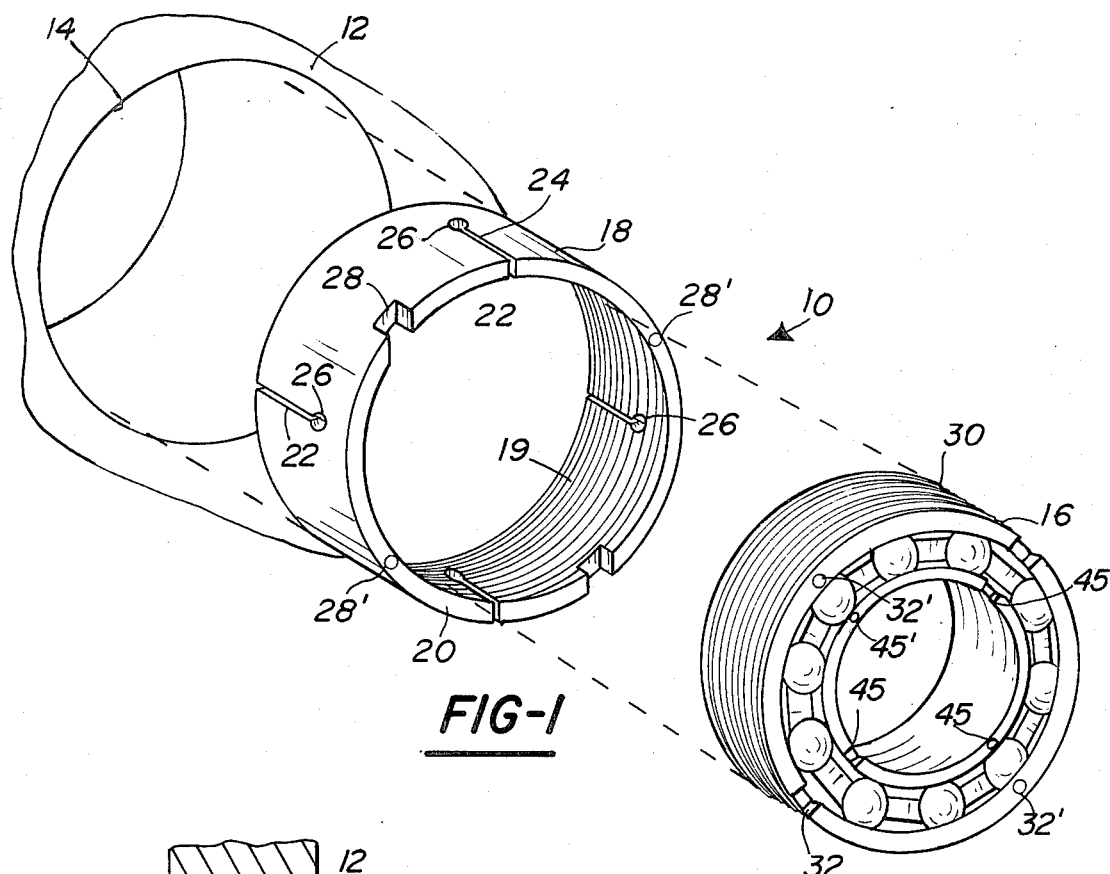
FIG. 1 illustrates an exploded perspective view of the present invention.
Figure 2:
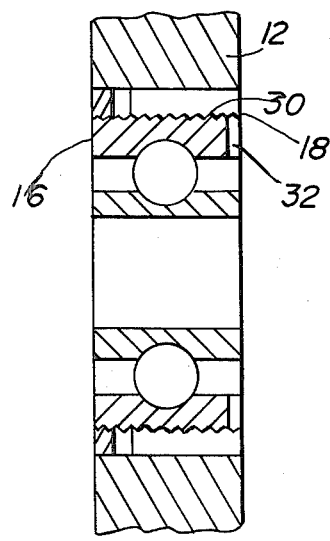
FIG. 2 illustrates a cross-sectional view of the present invention with the bearing and sleeve installed in the housing of the machine.

Referring now to the drawings and in particular to FIGS. 1 and 2 wherein there is illustrated at 10 a preferred embodiment of the present invention. A housing 12 has a bore 14 into which a replacement bearing is to be inserted to repair the machine. Normally, when a machine has a bearing which is in the process of failing, the deterioration of the bearing is not detected early enough to prevent extensive damage to the housing and shaft of the machine. In the process of failing, the bearing usually locks up and tends to rotate with the shaft which causes scoring and extensive damage to the bore of the housing into which the bearing has been mounted. To restore the machine to working order, the shaft and bearing must be replaced, however, the housing must be remachined due to the extensive damage caused to the bearing bore. The conventional manner for installing a replacement bearing calls for the machine housing to be machined oversized in the bearing bore, and a sleeve inserted which has an inside diameter similar to the original bearing outer diameter. Then a new shaft and replacement bearing are installed to restore the machine to working order. The above process is expensive and when the second bearing fails, the replacement sleeve often rotates within the housing forcing the machining process to restore the housing to accept a bearing to be repeated. Often, after the machine has been restored once, there is insufficient material to allow a second machining operation to restore the bearing bore, and the machine housing must be scrapped at great expense. The present invention provides a one time replacement of a damaged bearing with a bearing and sleeve which when properly installed will not cause damage to the housing or the sleeve when the replacement bearing fails. All that is required to replace the replacement bearing with a second replacement bearing is to remove the old bearing and install the new one.

Referring now to FIG. 1 wherein there is illustrated at 10 a preferred embodiment of the present invention. The housing 12 has been reworked to receive a replacement bearing 16. The housing 12 has had its bearing bore 14 bored oversize to receive a radially expandable sleeve 18. The previously used method of boring of the housing oversize to receive a press-fit sleeve required a very closed tolerance for the bore and the outside diameter of the sleeve to insure a proper press-fit between the parts. Since the sleeve 18 is radially expandable, the tolerance of the bore 14 to receive the sleeve 18 is substantially broader than would be possible for the previously used method. The radially expandable sleeve 18 has a plurality of radially movable segments along its periphery and a tapered threaded bore. The radially movable segments are formed by a first pair of diametrically opposed slots extending axially along the sleeve beginning at one end of the sleeve and terminating short of another end of the sleeve. The slots have an arcuate form at the bottom thereof. The arcuate extending from one side of the slot to the other to prevent stress concentrations at the termination of the slot. A second pair of diametrically opposed slots 90° from the first end of the sleeve terminating at an arcuate form similar to that of the first pair of slots. A first pair of diametrically opposed notches 28 or pin holes 28' in an outer end of the sleeve are configured to be engageable with a pair of lugs or pins of a first spanner wrench not shown which are used to prevent rotation of the sleeve 18 during its installation into the bore 14. The sleeve 18 may be made from any suitable material such as brass, plastic, and aluminum.

A replacement bearing 16 has a tapered threaded outer 30 which is complimentary to the tapered threaded surface of the sleeve 18. A second pair of diametrically opposed notches 32 or pin holes 32' in an outer end of the bearing 16 are configured to receive the lugs or pins of a second spanner wrench not shown which is used to threadingly engage the bearing outer race 16 into the threaded bore of the sleeve 18. As the outer race 16 is threadingly rotated into the bore of the sleeve 18, the taper of the threads 30 entering into the tapered threaded bore 19 of the sleeve 18, the radially movable segments expand radially outward to engage the bore 14 securing the sleeve into the housing 12.

FIG. 2 illustrates a cross-sectional view of the bearing mounting device and bearing 10 as assembled into the housing 12. The tapered thread 30 of the outer race 16 when threadingly engaged and tightened into the tapered threaded bore 19 of the sleeve 18 is locked from further rotation and the entire assembly is fixedly attached to the housing 12. If the replacement bearing should subsequently fail, there is no damage to the sleeve 18 or to the bore 14 of the housing 12 and the failed bearing can be efficiently and inexpensively replaced. To replace a failed bearing of the present invention, the first spanner wrench engages the notches 28 or pin holes 28' of the sleeve, and the second spanner wrench engages the notches 32 or pin holes 32' of the bearing, and the outer race 16 of the bearing is threadingly disengaged from the sleeve 18. A new bearing is then threadingly engaged into the sleeve and the damaged bearing has been replaced in a very short time.

Figure 3:
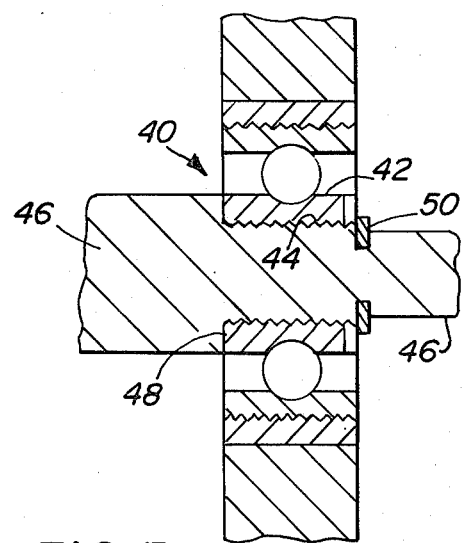
FIG. 3 illustrates a cross-sectional view of another embodiment of the invention employing a bearing with a tapered threaded inner bore and a tapered threaded shaft.

FIG. 3 illustrates a second embodiment of the present invention wherein a bearing 40 employs a tapered threaded bore in a manner which will be described more fully hereinbelow. When a bearing fails, it usually locks up and damages the bearing bore in the housing as described hereinabove. When the bearing locks up its also possible for the inner race of the bearing to spin on the shaft thereby damaging the shaft, requiring the shaft to be reworked before a replacemnnt bearing can be employed. To prevent the shaft 46 from being damaged the bearing 40 (FIG. 3) employs an inner race 42 having a tapered threaded bore 44. The inner race 42 has at its end a third pair of diametrically opposed notches 45 or pin holes 45' for engaging the lugs or pins of a third spanner wrench not shown which is used to rotatingly install the bearing 40 onto the shaft 46. A shoulder 48 of the shaft 46 prevents any further rotation of the inner race 42 when the inner race 42 is in abuttment with the shoulder 48. Torqueing of the inner race 42 against the shoulder 48 will prevent rotation of the inner race 42 relative to the shaft 46 and a retaining ring 50 can be employed to prevent the inner race 42 from backing off from its engagement with the shoulder 48.

The use of tapered threads to secure the bearing sleeve 16 to the sleeve 18 and the radially movable sleeve 18 expanding against the bore 14 is sufficient to prevent damage to the housing in the event of a replacement failure. It is possible, however, to use left and right handed threads judicioulsy, depending upon the rotation of the shaft, so that in the event of a bearing failure, the torque generated by the bearing in the process of failing is employed to rotate or tighten the bearing and sleeve thus assuring that no failure will cause housing or sleeve damage.

Having thus described our invention what we claim is:

1. A bearing mounting device and a bearing including an outer race and an inner race comprising:
    a radially expandable sleeve comprising radially movable segments along the periphery thereof, and a tapered, threaded bore;
    the bearing outer race having a tapered, threaded outer surface complementary to the bore;
    means engaging the bearing outer race for rotating the tapered threaded outer surface in the tapered threaded bore; and
    means for preventing rotation of the sleeve when the bearing is being rotated.

2. The bearing mounting device as defined in claim 1 wherein the radially movable segments comprise:
    a first pair of diametrically opposed slots extending axially along the sleeve beginning at one end of the sleeve and terminating short of another end of said sleeve;
    a second pair of diametrically opposed slots ninety degrees from the first pair of slots extending axially along the sleeve from the other end of said sleeve to a point short of the first end of said sleeve; and
    the first and second pairs of slots terminating with an arcuate form extending between sides of the slot.

3. The bearing mounting device and bearing as defined in claim 1 wherein the means for preventing rotation and the means for rotating the tapered threaded outer surface in the tapered threaded bore comprises a first pair of diametrically opposed notches in an outer end of the sleeve adapted to receive a first spanner wrench having a first pair of lugs complementary to the pair of diametrically opposed notches engageable with the first pair of opposed notches to secure the sleeve against rotation, and a second pair of opposed notches in an outer end of the outer race adapted to receive a second spanner wrench having a second pair of lugs to engage the second pair of opposed notches to threadingly engage the outer race with the sleeve.

4. The bearing mounting device and bearing as defined in claim 1 wherein the means for preventing rotation of the sleeve comprises a first pair of diametrically opposed notches in an outer end of the sleeve adapted to receive a first spanner wrench having a pair of lugs complementary to the pair of notches.

5. The bearing mounting device and bearing as defined in claim 1 further comprising:

the bearing inner race having a threaded tapered bore;

a shaft having a threaded tapered outer surface complementary to the inner race bore; and means for rotating the inner race to engage the threaded tapered outer surface.

6. The bearing mounting device and bearing as defined in claim 5 wherein the means for rotating the inner race comprises a pair of diametrically opposed notches in an outer end of the inner race adapted to receive a spanner wrench having a pair of lugs to engage the pair of opposed notches.

* * * * *